United States Patent

[11] 3,627,364

[72] Inventor: Martin Antoon Van Riet
Emmasingel, Eindhoven, Netherlands
[21] Appl. No. 12,295
[22] Filed Feb. 18, 1970
[45] Patented Dec. 14, 1971
[73] Assignee U.S. Philips Corporation
New York, N.Y.
[32] Priority Feb. 25, 1969
[33] Netherlands
[31] 6902949

[54] JOINT FOR CONNECTING PROFILED RODS
5 Claims, 5 Drawing Figs.
[52] U.S. Cl. .................................................. 287/189.36
, 52/665, 52/726
[51] Int. Cl. ................................................. F16b 7/22
[50] Field of Search ..................................... 287/189.36
A, 189.35, 54 A, 54 B, 54 C, 189.36 H; 46/29, 30,
31; 52/665, 726

[56] References Cited
UNITED STATES PATENTS

| | | | |
|---|---|---|---|
| 2,818,608 | 1/1958 | Lawrence | 287/189.36 H UX |
| 3,015,375 | 1/1962 | Lickliter et al. | 287/189.36 A |
| 3,216,539 | 11/1965 | Piget | 287/54 C X |
| 3,232,021 | 1/1966 | Wilson | 287/189.36 A X |
| 3,304,108 | 2/1967 | Hamilton et al. | 287/189.36 H |
| 3,319,389 | 5/1967 | Levine | 287/189.36 A X |

FOREIGN PATENTS 260,978   8/1965   Australia ........................ 287/189.36 A Primary Examiner—David J. Williamowski
Assistant Examiner—Wayne L. Shedd
Attorney—Frank R. Trifari ABSTRACT: A joint for connecting two profiled rods of U-shaped section and having a coupling manufactured from sheet material and comprising two resilient lugs by which the coupling is clamped on the profiled rods to be joined; all the joints occurring in mounting a frame, for example, a longitudinal joint, a transverse joint and a cross joint, can be made by means of only two types of couplings.

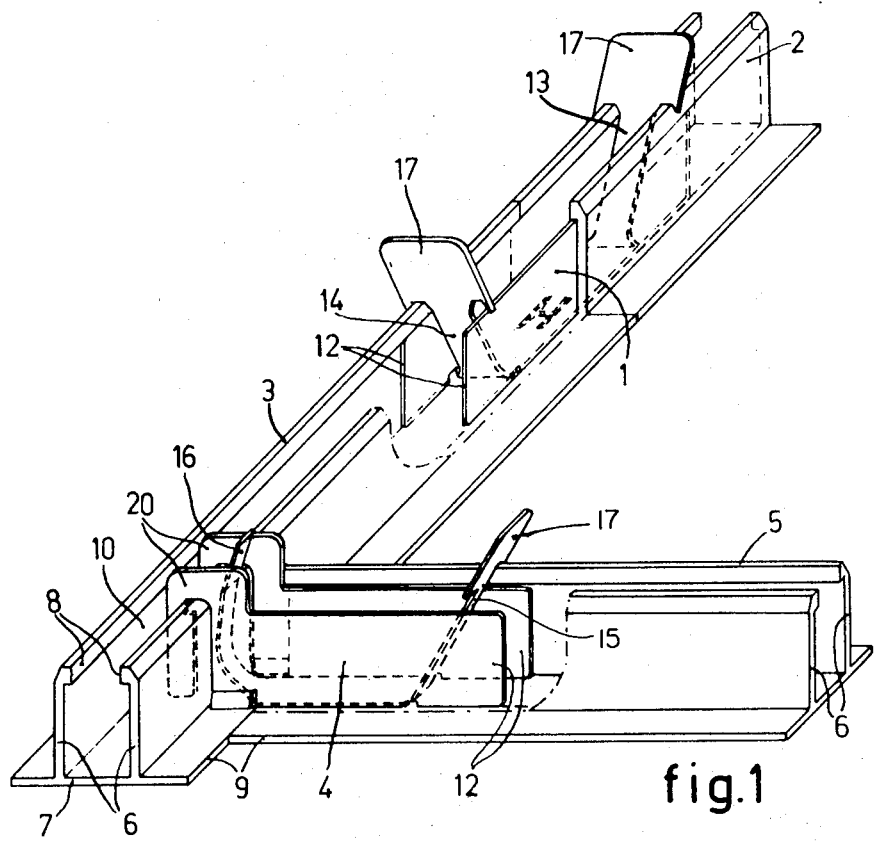
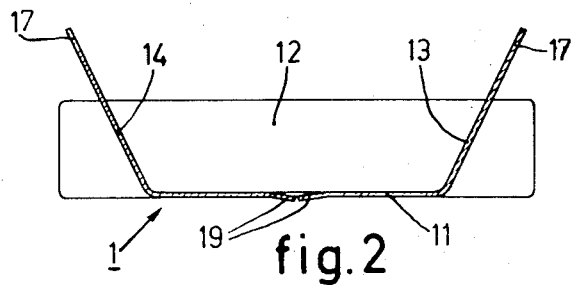
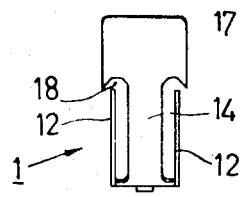
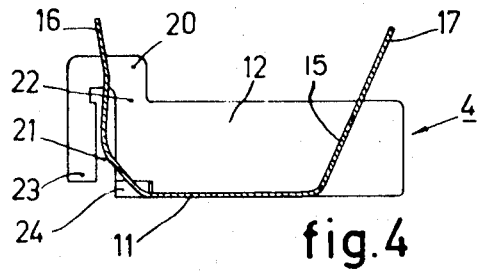
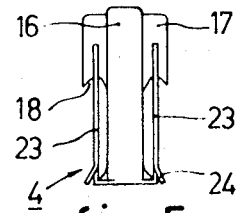
INVENTOR.
MARTIN A. VAN RIET

JOINT FOR CONNECTING PROFILED RODS

The invention relates to a joint for connecting two profiled rods of U-shaped section and having parallel sidewalls which comprise at their free ends flanges which face one another and which bound a slot. The joint comprises a coupling, part of which is placed in the slot of one profiled rod and another part of which is placed in the slot of the other profiled rod. The respective parts are clamped in the slots by parts of the coupling present outside the slots.

Such a joint is already known in which two profiled rods are connected in the longitudinal and transverse directions by means of a coupling; in this case the coupling comprises separate components which are connected together by means of a screw connection and are clamped to the profiled rods. The assembly of this known joint however, is complicated and time consuming.

It is an object of the invention to provide an inexpensive and screwless joint with fewer components which can be assembled or dismantled without tools in a very short period of time.

For that purpose the coupling which is formed from sheet material comprises a substantially U-shaped part which has two walls connected by a bottom portion and the width of which substantially corresponds to the width of at least one of the slots and which comprises two resilient lugs extending upwards between the walls and bent out of the plane of the bottom portion, said lugs cooperating with one of the profiled rods and in the coupled position project from the slots with their free ends. Since the coupling is manufactured from a strip of sheet material, the manufacture thereof is simple and inexpensive, particularly when manufactured in large quantities. Also, the coupling is clamped on the profiled rods to be connected by the resilient lugs without the use of a tool being necessary.

In order to ensure a good non-self-loosening clamping effect of the coupling on the profiled rod and to ensure maintaining of the coupling, at least one of the lugs is directed away at an angle from the center of the coupling and the free end projecting from the slot comprises a widened portion with which said lug, in the coupled position of the coupling, engages the flanges of the profiled rods in a clamping manner. In the case of a force being applied in the longitudinal direction and directed towards the end of the profiled rod, said lug, because of its inclined position, is locked with its widened portion in the material of the profiled rod, so that a self-clamping effect is obtained; the coupling can be further introduced in the profiled rod.

In an embodiment of the joint formed as a longitudinal joint, the other lug has a shape similar to that of the one lug and is also directed away from the center of the coupling but in a direction remote from that of the one lug, the bottom portion comprising two lugs bent out of the plane of the bottom portion which lugs each cooperate with the bottom connecting the two sidewalls of the profiled rods. The lugs prevent the coupling from being inserted into the profiled rods further than over a prescribed distance.

In an embodiment of the joint formed as a transverse joint each wall comprises a hook-shaped end which, in a position in which the profiled rods are engaging each other at an angle, hooks over the most adjacent flange, the other lug in the coupled position of the profiled rods engaging the external surface of said flange according to a resilient bent position. The hooks of the coupling can be introduced from above and between the flanges of the profiled rods into the slot and be locked with one of the sidewalls of the profiled rods; the resilient lug situated between the hooks presses against the outer side of the sidewall and ensures that the locking is maintained.

The end of the other lug is preferably slightly bent backwards and the hook-shaped ends of the walls situated on either side of the said lug each comprise a recess which is open towards the bottom portion and the shape of which corresponds to the cross section of the sidewalls of the profiled rods.

In order that the invention may be readily carried into effect, it will now be described in greater detail, by way of example, with reference to the accompanying drawing, in which FIG. 1 is a perspective view of a longitudinal and a transverse joint according to the invention;

FIG. 2 is a longitudinal cross-sectional view of a coupling for a longitudinal joint;

FIG. 3 is a front elevation of the coupling shown in FIG. 2;

FIG. 4 is a longitudinal cross-sectional view of a coupling for a transverse joint; and FIG. 5 is a front elevation of the coupling shown in FIG. 4.

The joint according to the invention consists of a coupling 1 for connecting the profiled rods 2 and 3 in the longitudinal direction and of a coupling 4 for connecting the profiled rods 3 and 5 in the transverse direction. The profiled rods 2, 3 and 5 have two parallel sidewalls 6 which extend at right angles to the bottom 7 and are each provided at their free end with a flange 8, the flanges 8 facing one another. Each profiled rod is provided on either side with a supporting edge 9 situated in the plane of the bottom 7 and serving for supporting ceiling slabs, panels, lighting fittings and so on. The sidewalls 6 together with the bottom 7 and the flanges 8 bound a slot 10.

The two coupling members 1 and 4 are manufactured from sheet material and have a substantially U-section with a bottom portion 11 and two parallel walls 12 bent at right angles out of the plane of said bottom portion 11; the width and the height of the U-shaped part correspond substantially to the width of the slot 10 and the distance from the bottom 7 to the lower side of the flanges 8, respectively. The bottom portion 11 of the two couplings 1 and 4 at either end changes into a resilient lug 13, 14, 15, 16 situated between the walls 12 and bent out of the plane of the bottom portion.

The coupling 1 is constructed so as to be symmetrical relative to surfaces extending at right angles to the center of the bottom portion 11 in the transverse and the longitudinal direction; the lugs 13 and 14 are directed at an angle upwards and towards the ends of the coupling member 1 and comprise at their ends projecting from the slot a widened portion 17 the width of which is larger than the distance between the flanges 8 so that the portions 17 bridge the sidewalls 6; each portion 17 comprises at its bridge portions a recess 18 the shape of which corresponds to the cross section of the flanges 8. In the uncoupled condition of the coupling 1, the distance between the bottom portion 11 and the upper side of the recesses 18 is smaller than the height of the sidewalls 6. The coupling 1 furthermore comprises two resilient lugs 19 facing one another and bent out of the plane of the bottom portion 11, which lugs cooperate with the bottom end faces of the profiled rods 2 and 3 to be connected.

When a longitudinal joint of the profiled rods 2 and 3 is effected by means of the coupling member 1, the portions 17 of the lugs 13 and 14 are pressed towards each other, and the coupling member 1 is introduced into the slots of the profiled rods 2 and 3. Owing to the friction of the walls 12 against the sidewalls 6 and of the bottom portion 11 against the bottom 7 of the profiled rods a slight frictional resistance must be overcome. The two profiled rods 2 and 3 are pressed against each other, the coupling 1 being guided by the sidewalls 6 and the bottom 7. The lugs 19 contacting the end faces of the bottom 7 prevent the coupling 1 from being introduced farther than half into the slot of one of the profiled rods. After releasing the portions 17, the recesses 18 will engage the end of the sidewalls 6 owing to the resilience and the inclined position of the lugs 13 and 14 and will lock in the material of the profiled rods so that the coupling can be introduced into the slots, but offers a large resistance when a force occurs in the opposite direction; this automatic clamping effect is intensified by providing the recesses 18 with sharp edges. By pressing the portions 17 towards each other manually, the clamping effect can be released and the joint can be dismantled in a simple manner.

The resilient lug 15 of the coupling 4 is identical to the lugs 13 and 14 of the coupling 1 and also shows a widened portion 17 having recesses 18; the other lug 16 of the coupling 4 is S-shaped and slightly perpendicular with respect to the bottom portion 11; at the height of the lug 16, the ends of the walls 12 have U-shaped hooks 20 situated on either side of the lug 16 and comprise a recess 21 and two limbs 22, 23 extending at right angles to the bottom portion 11; the open end of the recess 21 is directed towards the bottom portion 11; the edges of the recess 21 extend parallel to the cross section of the sidewalls 6 of the profiled rod 2. In the uncoupled position of the coupling 4, a part of the lug 16 is situated between the hooks 20; the limbs 22 directly adjoining the walls 12 comprise at their end directed towards the bottom portion 11 a stud 24 which is bent out of the perpendicular plane of the limbs, the two studs cooperating with the bottom end face of the profiled rod 3 and at the same time supporting the supporting edge 9 of the profiled rod 5.

When a transverse joint is made between the two profiled rods 3 and 5, the two lugs 15 and 16 of the coupling 4 are pressed towards each other and the coupling 4 is slid into the slot of the profiled rod 5 until the studs 24 engage the bottom end face of the profiled rod 5; the remaining free part of the coupling 4 is hooked over the sidewall 6 of the profiled rod 3 and between the flanges 8 is introduced into the slot 10 of said profiled rod until the studs 24 engage the supporting edge 9. Since the flange 8 falls into the recesses 21, the coupling 4 with the profiled rod 3 is locked. After releasing the lugs 15 and 16, the lug 15 engages the upper edge of the sidewall 6 of the profiled rod 5; the lug 16 forces against the outer side of the sidewall 6 of the profiled rod 3 and maintains the locking. By pressing the lug 16 manually in the direction of the lug 15, the coupling 4 with the profiled rod 5 coupled thereto can be moved to any place on the profiled rod 3; by pressing the lugs 15 and 16 towards each other the joint can be dismantled again.

When a cross joint is made, a second coupling 4 is hooked to the oppositely located sidewall 6 of the profiled rod 3.

Due to the invention it has become possible to make all joints occurring in mounting a frame, for example, longitudinal joints, transverse joints and cross joints, by means of only two types of couplings.

The bottom 7 of the profiled rods 2 and 3 touching the lugs 19 of the coupling 1 need not be closed throughout the length of the profiled rods; the bottom 7 may also be formed by transverse strips which are placed at some distance from each other and interconnect the two sidewalls 6.

What is claimed is:

1. A joint for connecting two profiled rods of U-shaped section and having parallel sidewalls which comprise at their free ends flanges which face one another and which bound a slot, said joint comprising a coupling a part of which is placed in the slot of one profiled rod and another part of which is placed in the slot of the other profiled rod, said parts being clamped in the slots by parts of the coupling present outside the slots, said coupling being formed from sheet material having a substantially U-shaped part which comprises two walls connected by a bottom portion and the width of which corresponds substantially to the width of at least one of the slots and which comprises two resilient lugs extending upwards between the walls and bent out of the plane of the bottom portion, said lugs each cooperating with one of the profiled rods and projecting from the slot with their free ends in the coupled position.

2. A joint as claimed in claim 1, wherein at least one of the lugs is directed away at an angle from the center of the coupling and the free end projecting from the slot comprises a widened portion with which said lug, in the coupled position of the coupling, engages the flanges of the profiled rods in a clamping manner.

3. A joint as claimed in claim 2 formed as a longitudinal joint, wherein the other lug has a shape similar to that of the one lug and is also directed away from the center of the coupling but in a direction remote from that of the one lug, the bottom portion comprising two lugs bent out of the plane of the bottom portion which lugs each cooperate with the bottom of the profiled rods connecting the two sidewalls.

4. A joint as claimed in claim 2, formed as a transverse joint, wherein each wall comprises a hook-shaped end which in a position in which the profiled rods are engaging each other at an angle hooks over the most adjacent flange, the other lug in the coupled position of the profiled rods engaging the external surface of said flange according to a resilient bent position.

5. A joint as claimed in claim 4, wherein the end of the other lug is slightly bent backwards and the hook-shaped ends of the walls situated on either side of said lug, each of said hook-shaped ends having comprise a recess which is open towards the bottom portion and the shape of which corresponds to the cross section of the sidewalls of the profiled rods.

* * * * *